(12) United States Patent
Lee et al.

(10) Patent No.: US 8,656,220 B2
(45) Date of Patent: Feb. 18, 2014

(54) SYSTEM-ON-CHIP AND DEBUGGING METHOD THEREOF

(75) Inventors: Jaegon Lee, Yongin-si (KR); Hyunsun Ahn, Seoul (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 264 days.

(21) Appl. No.: 13/102,084

(22) Filed: May 6, 2011

(65) Prior Publication Data

US 2011/0283141 A1 Nov. 17, 2011

(30) Foreign Application Priority Data

May 11, 2010 (KR) .................... 10-2010-0044108

(51) Int. Cl.
*G06F 11/00* (2006.01)
(52) U.S. Cl.
USPC .............................................. 714/30
(58) Field of Classification Search
USPC ............... 714/30, 31, 34, 39, 45; 713/300; 712/227
See application file for complete search history.

(56) References Cited

U.S. PATENT DOCUMENTS

| | | | | |
|---|---|---|---|---|
| 6,665,802 B1* | 12/2003 | Ober | ............................... | 713/320 |
| 6,895,530 B2* | 5/2005 | Moyer et al. | .................... | 714/25 |
| 7,051,306 B2* | 5/2006 | Hoberman et al. | ............ | 716/127 |
| 7,213,172 B2* | 5/2007 | Iovin et al. | ........................ | 714/36 |
| 7,346,820 B2* | 3/2008 | Padhye et al. | ................. | 714/726 |
| 8,190,931 B2* | 5/2012 | Laurenti et al. | ................ | 713/300 |
| 8,212,350 B2* | 7/2012 | Trobough et al. | .............. | 257/697 |
| 2008/0162071 A1* | 7/2008 | Stevens et al. | ................. | 702/122 |

FOREIGN PATENT DOCUMENTS

| | | |
|---|---|---|
| JP | 2005-222446 | 8/2005 |
| JP | 2008-226083 | 9/2008 |
| KR | 1020010067370 | 7/2001 |
| KR | 1020030025057 | 3/2003 |

OTHER PUBLICATIONS

Pajak, Dominic; "System Solutions for a Baseband SoC;" reprinted from IQ (Information Quarterly) Magazine, vol. 5, No. 2; Sep. 2006; http://www.design-reuse.com/articles/14361/system-solutions-for-a-baseband-soc.html.*

Leatherman, Rick; Ableidinger, Bruce; Stollon, Neal; "Processor and System Bus on Chip Instrumentation;" Proceedings of 2003 Embedded Systems Conference; Apr. 2003; http://www.fs2.com/pdfs/FS2_ESC03paper_521.PDF.*

* cited by examiner

*Primary Examiner* — Scott Baderman
*Assistant Examiner* — Joseph Kudirka
(74) *Attorney, Agent, or Firm* — F. Chau & Associates, LLC (57) ABSTRACT

A system-on-chip (SoC) includes a core, a plurality of power domain blocks, and a power control circuit including a debug circuit. The power control circuit is configured to control power supplied to the core and each of the power domain blocks, and the debug circuit is configured to debug the power control circuit.

17 Claims, 12 Drawing Sheets

SYSTEM-ON-CHIP AND DEBUGGING METHOD THEREOF

CROSS-REFERENCE TO RELATED APPLICATIONS

This application claims priority under 35 U.S.C. §119 to Korean Patent Application No. 10-2010-0044108, filed on May 11, 2010, the disclosure of which is incorporated by reference herein in its entirety.

BACKGROUND

1. Technical Field

The present disclosure relates to electronic circuits, and more particularly, to a system-on-chip (SoC) and a debugging method thereof.

2. Discussion of the Related Art

The number of devices that can be disposed on a single chip is increasing with the advance of semiconductor manufacturing technologies. As the number of devices disposed on a single chip increases, components such as a memory, a processor, and a power controller are integrated into a single chip. A system having various components such as a memory, a processor, and a power controller integrated into a single chip is commonly referred to as a system-on-chip (SoC). Since a system-on-chip (SoC) includes a single chip, it occupies a smaller area than a conventional system. Further, power consumption of the system-on-chip (SoC) is reduced compared to the power consumption of a conventional system.

SUMMARY

According to an exemplary embodiment of the inventive concept, a system-on-chip may include a core, a plurality of power domain blocks, and a power control circuit including a debug circuit. The power control circuit is configured to control a power supplied to the core and each of the power domain blocks, and the debug circuit is configured to debug the power control circuit.

In an exemplary embodiment of the inventive concept, the debug circuit may further include at least one input/output pin configured to allow the debug circuit to communicate with an entity.

In an exemplary embodiment of the inventive concept, the system-on-chip may further include an input/output interface configured to communicate with an external entity through a plurality of input/output pins. The debug circuit and the input/output interface may be configured to share at least one of the plurality of input/output pins.

In an exemplary embodiment of the inventive concept, the system-on chip may further include a debugging pin, different from the at least one input/output pin, configured to allow for debugging of the core.

In an exemplary embodiment of the inventive concept, the system-on-chip may further include a logic value debugger disposed in the debug circuit, configured to output a voltage level of at least one node of the power control circuit to an external entity, in response to a debug control signal during a debugging operation of the power control circuit.

In an exemplary embodiment of the inventive concept, the power control circuit may be configured to enter an operation maintenance mode during the debugging operation of the power control circuit.

In an exemplary embodiment of the inventive concept, the system-on-chip may further include an inserting debugger disposed in the debug circuit, configured to vary a voltage level of at least one node in the power control circuit, in response to a debug control signal during a debugging operation of the power control circuit.

In an exemplary embodiment of the inventive concept, the system-on-chip may further include a multiplexer disposed in the debug circuit and coupled between an output of a first function block of the power control circuit and an input of a second function block of the power control circuit, and configured to transmit one of the output of the first function block and a debugging input signal from the inserting debugger to the input of the second function block under a control of the inserting debugger.

In an exemplary embodiment of the inventive concept, the system-on-chip may further include a variation debugger disposed in the debug circuit, configured to output a variation value based on a variation over time of a voltage of at least one node in the power control circuit to an external entity, in response to a debug control signal during a debugging operation of the power control circuit.

In an exemplary embodiment of the inventive concept, the system-on-chip may further include an inserting debugger disposed in the debug circuit, and a logic value debugger disposed in the debug circuit. The inserting debugger may be configured to vary a voltage level of a first node in the power control circuit. The logic value debugger may be configured to output a voltage level of a second node in the power control circuit, based on the variation of the voltage level of the first node, to an external entity during a debugging operation of the power control circuit.

In an exemplary embodiment of the inventive concept, the system-on-chip may further include an inserting debugger disposed in the debug circuit, and a variation debugger disposed in the debug circuit. The inserting debugger may be configured to vary a voltage level of a first node in the power control circuit. The variation debugger may be configured to output a time-lapse voltage variation of a second node in the power control circuit, based on the variation of the voltage level of the first node, to an external entity during a debugging operation of the power control circuit.

In an exemplary embodiment of the inventive concept, the system-on-chip may further include a joint test action group (JTAG) interface, configured to allow the core to be debugged based on a JTAG protocol.

According to an exemplary embodiment of the inventive concept, a debugging method for a system-on-chip may include debugging an operation of the system-on-chip through a debugging pin disposed on the system-on-chip, and debugging a power control circuit of the system-on-chip through a plurality of input/output pins, different from the debugging pin, disposed on the system-on-chip.

In an exemplary embodiment of the inventive concept, debugging the power control circuit may include detecting a voltage level of at least one first node in the power control circuit.

In an exemplary embodiment of the inventive concept, debugging the power control circuit may further include varying the voltage level of at least one node, other than the at least one first node, in the power control circuit.

In an exemplary embodiment of the inventive concept, debugging the power control circuit may further include monitoring a voltage variation of at least one node, other than the at least one first node, in the power control circuit.

In an exemplary embodiment of the inventive concept, debugging the power control circuit may further include varying the voltage level of the at least one first node in the power control circuit, and detecting a voltage level of at least one second node in the power control circuit, based on the variation of the voltage level of the at least one first node.

In an exemplary embodiment of the inventive concept, debugging the power control circuit may further include varying the voltage level of the at least one first node in the power control circuit, and monitoring a voltage variation of at least one second node in the power control circuit, based on the variation of the voltage level of the at least one first node.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Exemplary embodiments of the present inventive concept will be described more fully hereinafter with reference to the accompanying drawings. Like reference numbers may refer to like elements throughout the accompanying drawings.

Figure 1:
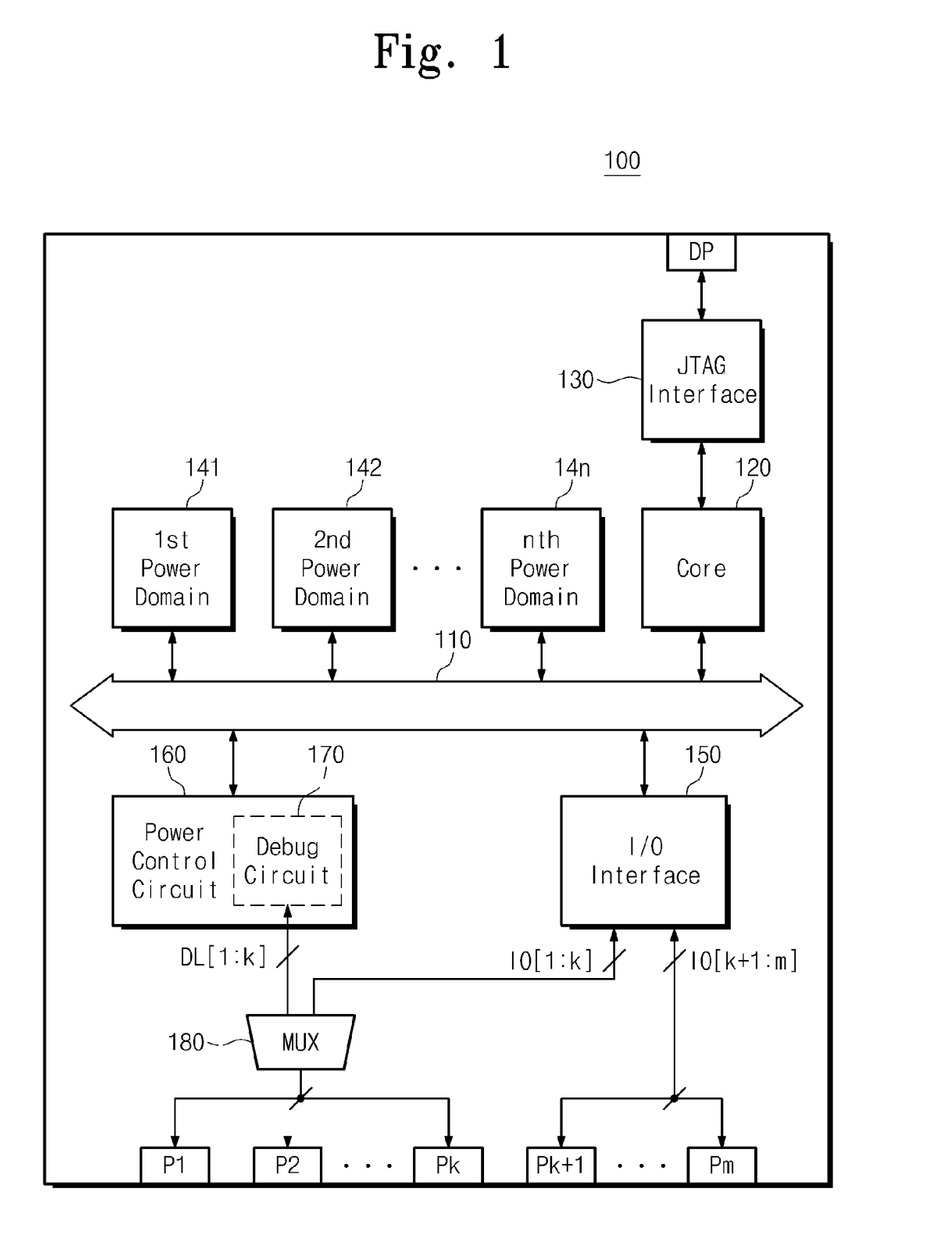
FIG. 1 is a block diagram of a system-on-chip (SoC) according to an exemplary embodiment of the inventive concept.

FIG. 1 is a block diagram of a system-on-chip (SoC) 100 according to an exemplary embodiment of the inventive concept. As illustrated, the system-on-chip (SoC) 100 includes a system bus 110, a core 120, a joint test action group (JTAG) interface 130, first to nth power domain blocks 141~14n, an input/output (I/O) interface 150, and a power control circuit 160.

The system bus 110 provides a channel between components of the system-on-chip (SoC) 100.

The core 120 is configured to provide an overall operation of the system-on-chip (SoC) 100. The core 120 may be, for example, an ARM processor. The system-on-chip (SoC) 100 may include, for example, at least one core 120. The core 120 is connected to the system bus 110 and the JTAG interface 130.

The JTAG interface 130 is connected to the core 120 and a debugging pin DP. The JTAG interface 130 is configured to provide means for debugging the system-on-chip (SoC) 100 through the debugging pin DP and the core 120. For example, debugging for the system-on-chip (SoC) 100 may be performed by inputting a specific code to the core 120 through the JTAG interface 130. For example, debugging the system-on-chip (SoC) 100 through the debugging pin DP and the core 120 may be performed based on JTAG. However, debugging the system-on-chip (SoC) 100 through the debugging pin DP and the core 120 is not limited to JTAG-based debugging. In addition, the system-on-chip (SoC) 100 may include at least one debugging pin DP, but is not limited thereto.

Each of the first to nth power domain blocks 141~14n is connected to the system bus 110. Each of the first to nth power domain blocks 141~14n is configured to perform a predetermined operation. For example, each of the first to nth power domain blocks 141~14n may include at least one of various components such as, for example, a memory, a clock generator, an internal interface, a timer, and/or a power-on reset circuit.

Each power domain block may independently receive power. For example, an nth power domain block 14n may receive power through a power line which is different from those of the other domain blocks. That is, each of the first to nth power domain blocks 141~14n may be independently controlled in either one of a sleep mode and a normal mode.

The I/O interface 150 is connected to the system bus 110. The I/O interface 150 is connected to input/output pins P1~Pm through input/output signal lines IO[1:m]. That is, the I/O interface 150 is configured to communicate with an external entity through the input/output signal lines IOM[1:m].

For example, first to kth input/output lines IO[1:k] are connected to a multiplexer 180 and (k+1)th to mth input/output signal lines IO[k+1:m] are connected to (k+1)th to mth input/output pins Pk+1~Pm. K may be, for example, a positive integer equal to or less than m.

For example, the I/O interface 150 is configured to communicate with an external entity, based on at least one of various protocols such as, for example, a universal serial bus (USB) protocol, a multimedia card (MMC) protocol, a peripheral component interconnection (PCI) protocol, a PCI-express (PCI-E) protocol, an advanced technology attachment (ATA) protocol, a serial ATA (SATA) protocol, a parallel ATA (PATA) protocol, a small computer small interface (SCSI) protocol, an enhanced small disk interface (ESDI) protocol, an integrated drive electronics (IDE) protocol, a FireWire protocol, and/or an Ethernet protocol.

The power control circuit 160 is connected to the system bus 110. The power control circuit 160 is configured to independently control power supplied to the core 120 and the first to nth power domain blocks 141~14n. For example, when the core 120 is in an idle mode, power supplied to the core 120 is disabled under the control of the power control circuit 160. Similarly, when at least one of the first to nth power domain blocks 141~14n is in an idle mode, power supplied to the at least one power domain block in an idle mode is disabled under the control of the power control circuit 160.

The power control circuit 160 may include a debug circuit 170, which provides debugging means for the power control circuit 160. The debug circuit 170 is connected to the multiplexer 180 through first to kth debug lines DL[1:k].

The multiplexer 180 is connected to the debug circuit 170 through the first to kth debug lines DL[1:k] and connected to the I/O interface 150 through the first to kth input/output signal lines IO[1:k]. The multiplexer 180 selects one of the first to kth debug lines DL[1:k] and the first to kth input/output signal lines IO[1:k] and connects the selected line to first to kth input/output pins P1~Pk. For example, the multiplexer 180 may select one of the first to kth debug lines DL[1:k] and the first to kth input/output signal lines IO[1:k] based on a signal received through a specified one of the first to kth input/output pins P1~Pk.

The debug circuit 170 communicates with an external entity through the first to kth debug lines DL[1:k] and the first to kth input/output pins P1~Pk. For example, the debug circuit 170 may receive a debug control signal through the first to kth debug lines DL[1:k] and the first to kth input/output pins P1~Pk and output a debug result.

The debug circuit 170 or the power control circuit 160 shares at least one input/output pin with the I/O interface 150. That is, the debug circuit 170 or the power control circuit 160 receives a debug control signal through at least one of the input/output pins used by the I/O interface 150 and outputs a debug result. For example, among the first to mth input/output pins P1~Pm, the first to kth input/output pins P1~Pk that are unused during a debugging operation of the power control circuit 160 may be used by the debug circuit 170. Accordingly, a separate pin for debugging the power control circuit 160 is not required.

Figure 2:
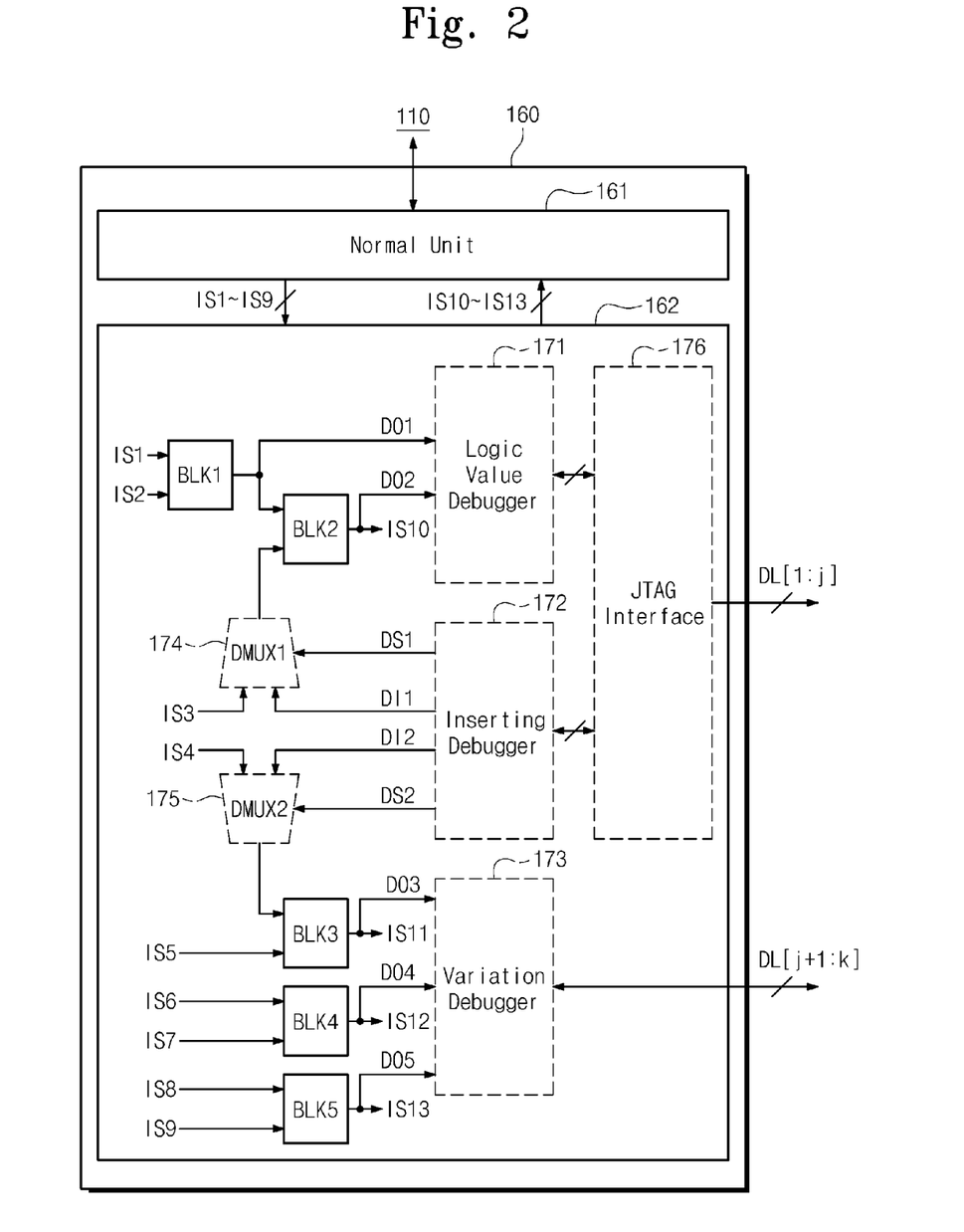
FIG. 2 is a block diagram of an exemplary embodiment of the power control circuit including a debug circuit shown in FIG. 1.

FIG. 2 is a block diagram of an exemplary embodiment of the power control circuit 160 including the debug circuit 170 shown in FIG. 1. As illustrated, the power control circuit 160 includes a normal unit 161 and a debugging unit 162.

The normal unit 161 includes components in the power control circuit 160 that are not used for debugging. The debugging unit 162 includes the debug circuit 170 and components in the power control circuit 160 that are used for debugging. The normal unit 161 is configured to communicate with the system bus 110. The normal unit 161 and the debugging unit 162 are configured to exchange first to thirteenth internal signals IS1~IS13.

The debugging unit 162 includes first to fifth blocks BLK1~BLK5, a logic value debugger 171, an inserting debugger 172, a variation debugger 173, first and second debugger multiplexers 174 and 175, and a JTAG interface 176.

Each of the first to fifth blocks BLK1~BLK5 may be a function block configured to perform a specific operation. For example, each of the first to fifth blocks BLK1~BLK5 may be configured to perform at least one of various operations such as, for example, an AND operation, an OR operation, a NAND operation, a NOR operation, an XAND operation, an XOR operation, a NOT operation, an inverting operation, a delay operation, an analog-to-digital conversion operation, a digital-to-analog conversion operation, and/or a counting operation, or at least two combinations thereof. For example, each of the first to fifth blocks BLK1~BLK5 may include a transistor or a combination of at least two transistors.

The debug circuit 170 may include the logic value debugger 171, the inserting debugger 172, the variation debugger 173, and the first and second debug multiplexers 174 and 175. In the power control circuit 160 shown in FIG. 2, components of the debug circuit 170 are denoted by dotted lines.

The logic value debugger 171 is connected to first and second debug output lines DO1 and DO2. The inserting debugger 172 is connected to first and second debug input lines DI1 and DI2, and first and second debug selection lines DS1 and DS2. The variation debugger 173 is connected to third to fifth debug output lines DO3~DO5. The logic value debugger 171, the inserting debugger 172, and the variation debugger 173 control the first to fifth debug output lines DO1~DO5, the first and second debug input lines DI1 and DI2, and the first and second debug selection lines DS1 and DS2 to provide debugging means of the power control circuit 160.

For example, the logic value debugger 171 and the inserting debugger 172 may be configured to operate based on a JTAG protocol. For example, the logic value debugger 171 and the inserting debugger 172 may be connected to first to jth input/output pins P1~Pj through the JTAG interface 176, first to jth debug lines DL[1:j], and the multiplexer 180 shown in FIG. 1. j may be a positive integer equal to or greater than k. However, the logic value debugger 171 and the inserting debugger 172 are not limited to operating based on the JTAG protocol.

For example, the variation debugger 173 may directly connect the debugging result to (j+1)th to kth input/output pins Pj+1~Pk through (j+1)th to kth debug lines and the multiplexer 180. Thus, the variation debugger 173 may not require a separate interface.

Hereinafter, for the brevity of explanation, debug lines and signals transmitted through the debug lines will be cited using the same or similar reference numerals. For example, signals transmitted through the first to fifth debug output lines DO1~DO5 are cited as first to fifth debug output signals DO1~DO5, signals transmitted through the first and second debug input lines DI1 and DI2 are cited as first and second debug input signals DI1 and DI2, and signals transmitted through the first and second debug selection lines DS1 and DS2 are cited as first and second debug selection signals DS1 and DS2.

The first block BLK1 of the power control circuit 160 receives first and second internal signals IS1 and IS2. An output of the first block BLK1 is transmitted to the second block BLK2 and transmitted to the logic value debugger 171 as a first debug output signal DO1.

The second block BLK2 receives an output of the first block BLK1 and an output of the first debug multiplexer 174. An output of the second block BLK2 is output as a tenth internal signal IS10 and transmitted to the logic value debugger 171 as a second debug output signal DO2.

The first debug multiplexer 174 receives a third internal signal IS3 and a first debug input signal DI1. The first debug multiplexer 174 is configured to output either one of the third internal signal IS3 or the first debug input signal DI1 in response to the first debug selection signal DS1. An output of the first debug multiplexer 174 is transmitted to the second block BLK2.

The second debug multiplexer 175 receives a fourth internal signal IS4 and a second debug input signal DI2. The second debug multiplexer 175 is configured to output either one of the fourth internal signal IS4 or the second debug input signal DI2 in response to the second debug selection signal DS2. An output of the second debug multiplexer 175 is transmitted to the third block BLK3.

The third block BLK3 receives a fifth internal signal IS5 and the output of the second debug multiplexor 175. An output of the third block BLK3 is output as an eleventh internal signal IS11 and transmitted to the variation debugger 173 as a third debug output signal DO3.

The fourth block BLK4 receives sixth and seventh internal signals IS6 and IS7. An output of the fourth block BLK4 is output as a twelfth internal signal IS12 and transmitted to the variation debugger 173 as a fourth debug output signal DO4.

The fifth block BLK5 receives eighth and ninth internal signals IS8 and IS9. An output of the fifth block BLK5 is output as a thirteenth internal signal IS13 and transmitted to the variation debugger 173 as a fifth debug output signal DO5.

The logic value debugger 171 is configured to detect a logic value (e.g., a level of a signal or a voltage) of at least one node of the power control circuit 160. For example, in FIG. 2, the logic value debugger 171 is connected to the first and second debug output lines DO1 and DO2. That is, the logic value debugger 171 may detect a logic value (e.g., a signal or voltage) of an output node of the first block BLK1 and a logic value (e.g., a signal or voltage) of an output node of the second block BLK2. A detection result is output through the JTAG interface 176 and the first to jth debug lines DL[1:j].

The inserting debugger 172 is configured to insert a specified logic value (e.g., a signal or voltage) into at least one node of the power control circuit 160. For example, in FIG. 2, the inserting debugger 172 is connected to the first and second debug input lines DI1 and DI2 and the first and second debug selection lines DS1 and DS2. That is, the inserting debugger 172 controls the first debug selection signal DS1 to insert one of the third internal signal IS3 or the first debug input signal DI1 into an input node of the second block BLK2. In addition, the inserting debugger 172 controls the second debug selection signal DS2 to insert one of the fourth internal signal IS4 or the second debug input signal DI2 into an input node of the third block BLK3. For example, the third and fourth internal signals IS3 and IS4 and the first and second debug input signals DI1 and DI2 may be received through the first to jth debug lines DL[1:j] and the JTAG interface 176.

The variation debugger 173 is configured to detect the variation of a signal (e.g., a voltage or logic level) over time of at least one node of the power control circuit 160. For example, in FIG. 2, the variation debugger 173 is configured to detect the variation of the eleventh internal signal IS11 output by the third block BLK3, the variation of the twelfth internal signal IS12 output by the fourth block BLK4, and the variation of the thirteenth internal signal IS13 output by the fifth block BLK5. Detected signals are output through debug lines DL[j+1:k].

Although it is illustrated in FIG. 2 that each of the first to fifth blocks BLK1~BLK5 receives two input signals, exemplary embodiments of the present inventive concept are not limited thereto. For example, each of the first to fifth blocks BLK1~BLK5 may be configured to receive at least one input signal and output at least two output signals.

Figure 3:
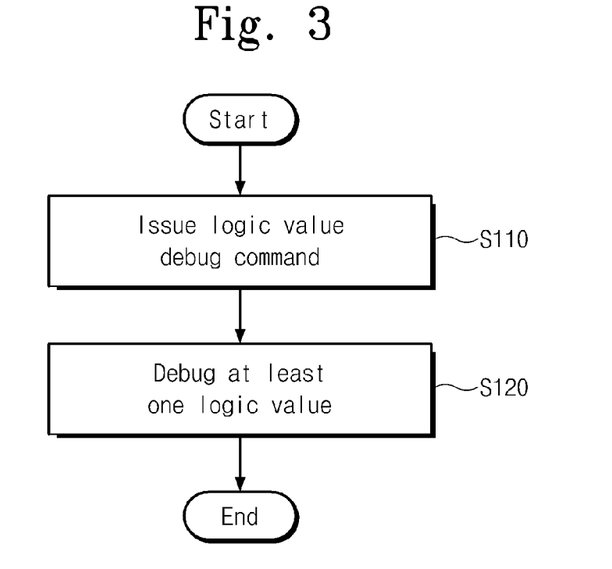
FIG. 3 is a flowchart illustrating an exemplary embodiment of a debugging method of the system-on-chip (SoC) described with reference to FIGS. 1 and 2.

FIG. 3 is a flowchart illustrating an exemplary embodiment of a debugging method of the system-on-chip (SoC) 100 described with reference to FIGS. 1 and 2. Referring to FIGS. 1 and 3, at S110, a logic value debug command (e.g., a debug control signal) is issued. For example, a logic value debug command (e.g., a debug control signal) may be transmitted to the power control circuit 160 or the debug circuit 170 from a debug device (not shown) through the first to jth input/output pins P1~Pj, the first to jth debug lines DL[1:j], and the JTAG interface 176.

For example, the power control circuit 160 may enter an operation maintenance mode when a logic value debug command is received. For example, in the operation maintenance mode, although an operation condition of the power control circuit 160 is changed, the power control circuit 160 may not perform an operation depending on the changed condition. For example, in the operation maintenance mode, the power control circuit 160 may be maintained at a level of internal signals (e.g., IS1~IS13).

For example, when a logic value debug command is received, the logic value debugger 171 may be activated.

At S120, at least one logic value is debugged. For example, the activated logic value debugger 171 may detect at least one logic value (e.g., a voltage or signal) at the power control circuit 160. For example, the activated logic value debugger 171 may output at least one of the first and second debug output signals DO1 and DO2 through the JTAG interface 176, the first to jth debug lines DL[1:j], and the first to jth input/output pins P1~Pj. For example, the activated logic value debugger 171 may select a signal including one of the first and second debug output signals DO1 and DO2 to be output to an external entity, in response to the logic value debug command (e.g., a debug control signal).

That is, the logic value debugger 171 outputs a logic value (e.g., a voltage or signal) of at least one node in the power control circuit 160 in response to the logic value debug command (e.g., a debug control signal). Thus, the power control circuit 160 may be debugged based on the output of the logic value debugger 171.

Figure 4:
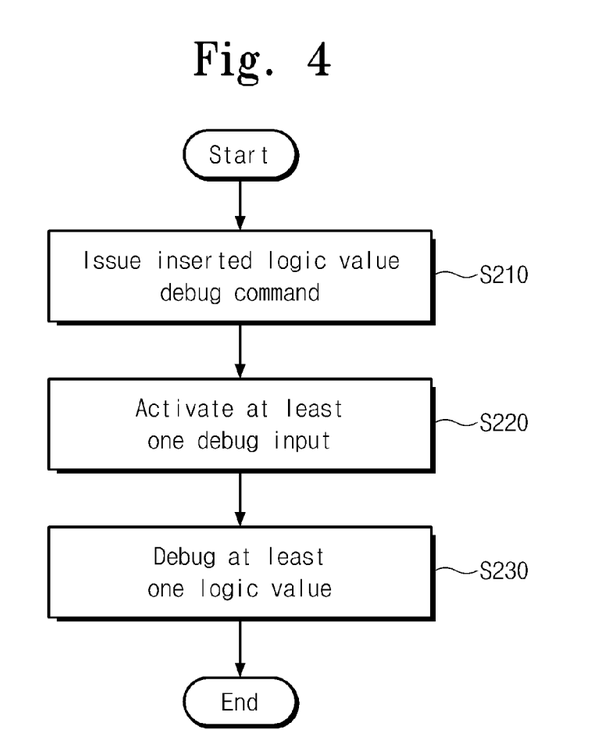
FIG. 4 is a flowchart illustrating an exemplary embodiment of a debugging method of the system-on-chip (SoC) described with reference to FIGS. 1 and 2.

FIG. 4 is a flowchart illustrating an exemplary embodiment of a debugging method of the system-on-chip (SoC) 100 described with reference to FIGS. 1 and 2. Referring to FIGS. 1, 2, and 4, at S210, an inserted logic value debug command (e.g., a debug control signal) is issued. The logic value debugger 171 and the inserting debugger 172 may be activated in response to the inserted logic value debug command (e.g., the debug control signal).

For example, the power control circuit 160 may enter a maintenance mode in response to the inserted logic value debug command (e.g., the debug control signal).

At S220, at least one debug input is activated. For example, the activated inserting debugger 172 may control one or both of the first and second debugger multiplexers 174 and 175 in response to the inserted logic value debug command (e.g., the debug control signal). For example, the inserting debugger 172 may perform one or both of an operation of inserting the first debug input signal DI1 into an input of the first block BLK2, and an operation of inserting the second debug input signal DI2 into an input of the third block BLK3, in response to the inserted logic value debug command (e.g., the debug control signal).

For example, in response to the inserted logic value debug command (e.g., the debug control signal), the inserting debugger 172 determines whether the first and second debug multiplexers 174 and 175 are controlled.

At S230, at least one logic value is debugged. For example, the operation at S230 may be carried out by the logic value debugger 171 activated in response to the inserted logic value debug command (e.g., the debug control signal). The operation at S230 may be carried out in a similar manner as the operation at S120 as explained with reference to FIG. 3.

In response to the inserted logic value debug command (e.g., the debug control signal), a specified logic value is inserted into at least one first node in the power control circuit 160, and a logic value of at least one second node is output according to the specified logic value inserted into the at least one first node. Thus, a state in the power control circuit 160 may be controlled and the power control circuit 160 may be debugged.

Figure 5:
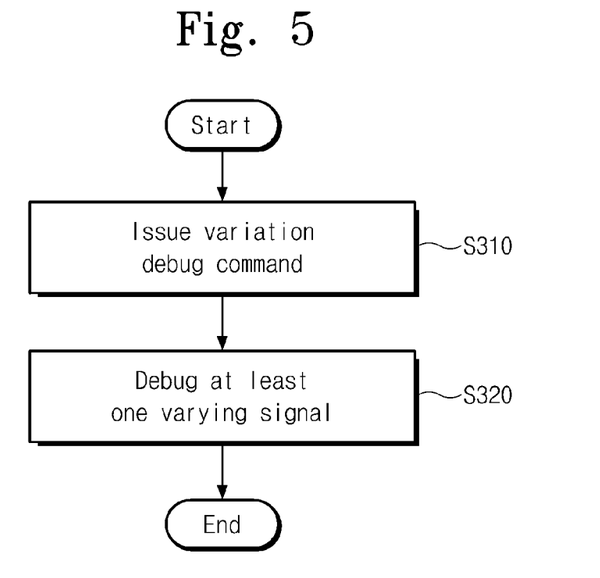
FIG. 5 is a flowchart illustrating an exemplary embodiment of a debugging method of the system-on-chip (SoC) described with reference to FIGS. 1 and 2.

FIG. 5 is a flowchart illustrating an exemplary embodiment of a debugging method of the system-on-chip (SoC) 100 described with reference to FIGS. 1 and 2. Referring to FIGS. 1, 2, and 5, at S310, a variation debug command (e.g., a debug control signal) is issued. The variation debugger 173 may be activated in response to the variation debug command (e.g., the debug control signal). For example, the variation debug command may be received through at least one of the debug lines DL[j+1:k].

At S320, at least one varying signal is debugged. The activated variation debugger 173 may detect the variation of a voltage (e.g., a signal or logic value) over time of at least one node of the power control circuit 160. For example, the activated variation debugger 173 may output the variation over time of at least one of the third to fifth debug output signals DO3~DO5 through debug lines DL[j+1:k] and input/output pins Pj+1~Pk. For example, the activated variation debugger 173 may select a signal from among the third to fifth debug output signals DO3~DO5 to be output to an external entity, in response to the variation debug command or the debug control signal.

That is, the variation debugger 173 outputs the variation over time of a voltage (e.g., a signal or logic value) of at least one node in the power control circuit 160 in response to the variation debug command (e.g., the debug control signal). Thus, an operation of the power control circuit 160 may be debugged in real-time based on the output of the variation debugger 173.

Figure 6:
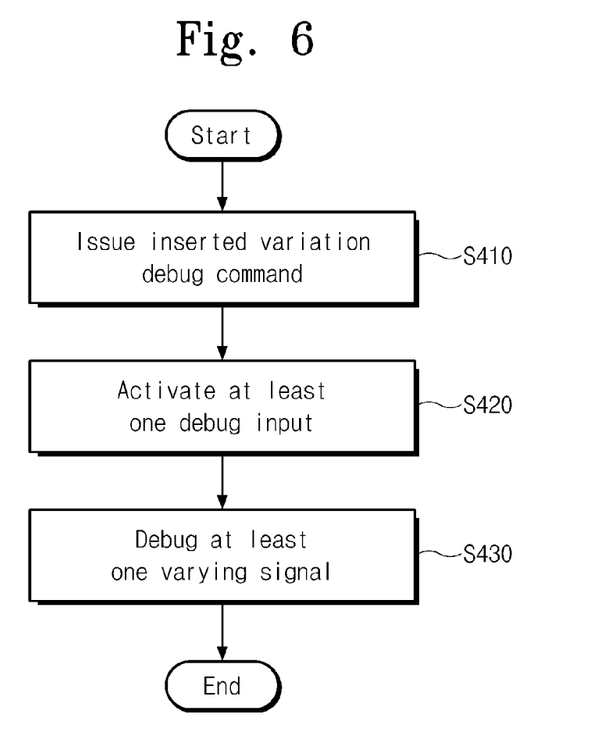
FIG. 6 is a flowchart illustrating an exemplary embodiment of a debugging method of the system-on-chip (SoC) described with reference to FIGS. 1 and 2.

FIG. 6 is a flowchart illustrating an exemplary embodiment of a debugging method of the system-on-chip (SoC) 100 described with reference to FIGS. 1 and 2. Referring to FIGS. 1, 2, and 6, at S410, an inserted variation debug command (e.g., a debug control signal) is issued. The inserting debugger 172 and the variation debugger 173 may be activated in response to the inserted variation debug command (e.g., the debug control signal). For example, the inserted variation debug command may be transmitted through at least one of the first to jth debug lines DL[1:j] and at least one of the debug lines DL[j+1:k].

At S420, at least one debug input is activated. The operation at S420 may be carried out by the activated inserting debugger 172. The operation at S420 may be carried out in a similar manner as the operation at S220 as explained with reference to FIG. 4.

At S430, at least one varying signal is debugged. The operation at S430 may be carried out by the activated variation debugger 173. The operation at S430 may be carried out in a similar manner as the operation at S320 as explained with reference to FIG. 5.

That is, in response to the inserted variation debug command (e.g., the debug control signal), a specified logic value is inserted into at least one first node in the power control circuit 160, and a signal (e.g., a voltage or logic value) of at least one second node is varied according to the inserted specified value. Thus, a state in the power control circuit 160 may be controlled and an operation of the power control circuit 162 may be debugged in real time.

Figure 7:
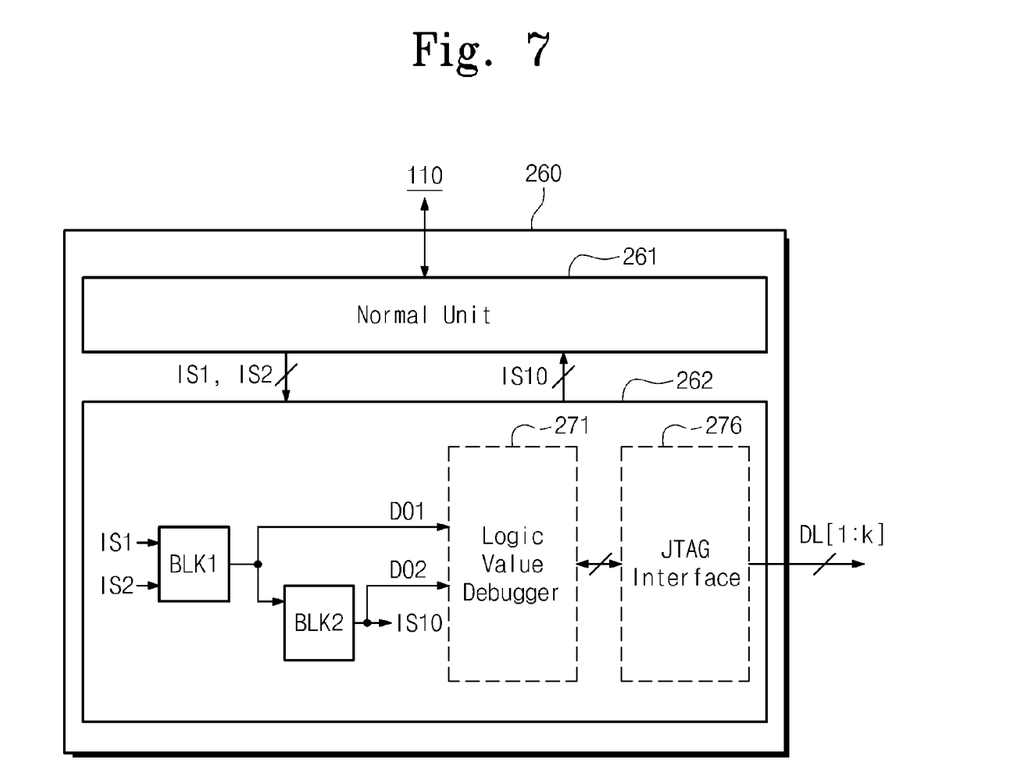
FIG. 7 is a block diagram illustrating a power control circuit that may be used in a system-on-chip (SoC) according to an exemplary embodiment of the present inventive concept.

FIG. 7 is a block diagram illustrating a power control circuit that may be used in a system-on-chip (SoC) according to an exemplary embodiment of the present inventive concept.

Referring to FIG. 7, a power control circuit 260 includes a normal unit 261 and a debugging unit 262. The power control circuit 260 has a similar structure as the power control circuit 160 described with reference to FIG. 2, except that the debugging unit 262 provides a logic value debugging function executed by a logic value debugger 271, and does not include an inserting debugger or a variation debugger. The debugging unit 262 includes a JTAG interface 276.

Debugging for the power control circuit 260 may be performed, for example, according to the method described with reference to FIG. 3.

Figure 8:
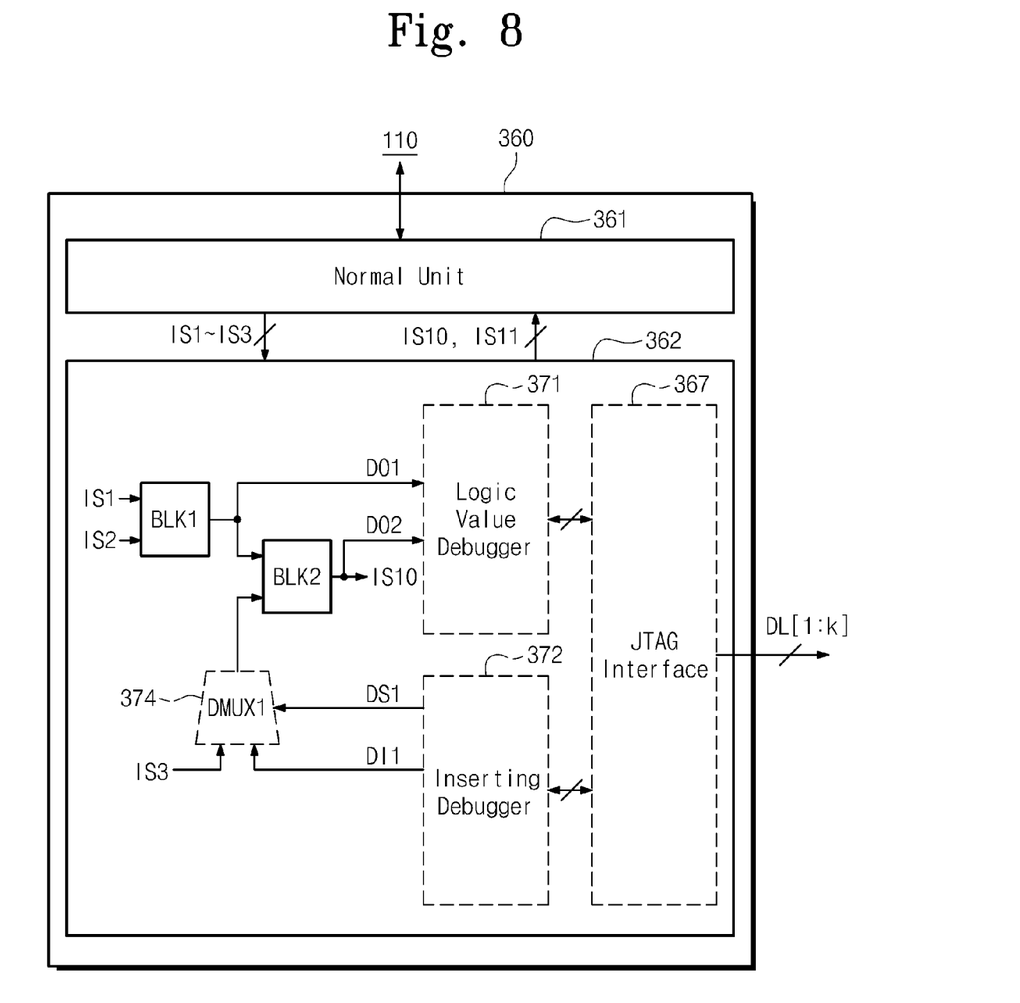
FIG. 8 is a block diagram illustrating a power control circuit that may be used in a system-on-chip (SoC) according to an exemplary embodiment of the present inventive concept.

FIG. 8 is a block diagram illustrating a power control circuit that may be used in a system-on-chip (SoC) according to an exemplary embodiment of the present inventive concept.

Referring to FIG. 8, a power control circuit 360 includes a normal unit 361 and a debugging unit 362. The power control circuit 360 has a similar structure as the power control circuit 160 described with reference to FIG. 2, except that the debugging unit 362 provides a logic value debugging function executed by a logic value debugger 371 and an inserting debugging function executed by an inserting debugger 372, and does not include a variation debugger. The debugging unit 362 includes a JTAG interface 367 and a debugger multiplexer 374.

Debugging for the power control circuit 360 may be performed, for example, according to the method described with reference to FIG. 3 or 4.

Figure 9:
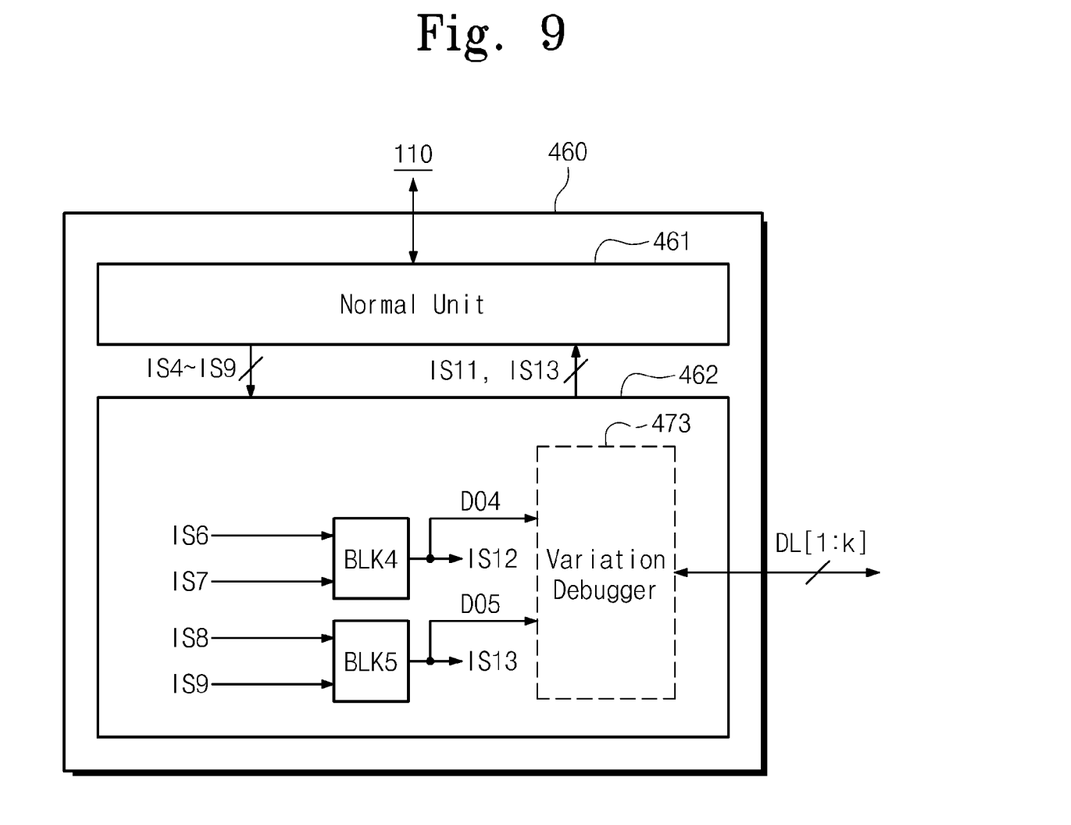
FIG. 9 is a block diagram illustrating a power control circuit that may be used in a system-on-chip (SoC) according to an exemplary embodiment of the present inventive concept.

FIG. 9 is a block diagram illustrating a power control circuit that may be used in a system-on-chip (SoC) according to an exemplary embodiment of the present inventive concept.

Referring to FIG. 9, a power control circuit 460 includes a normal unit 461 and a debugging unit 462. The power control circuit 460 has a similar structure as the power control circuit 160 described with reference to FIG. 2, except that the debugging unit 462 provides a variation debugging function executed by a variation debugger 473 and does not include a logic value debugger, an inserting debugger, or a JTAG interface.

Debugging for the power control circuit 460 may be performed, for example, according to the method described with reference to FIG. 5.

Figure 10:
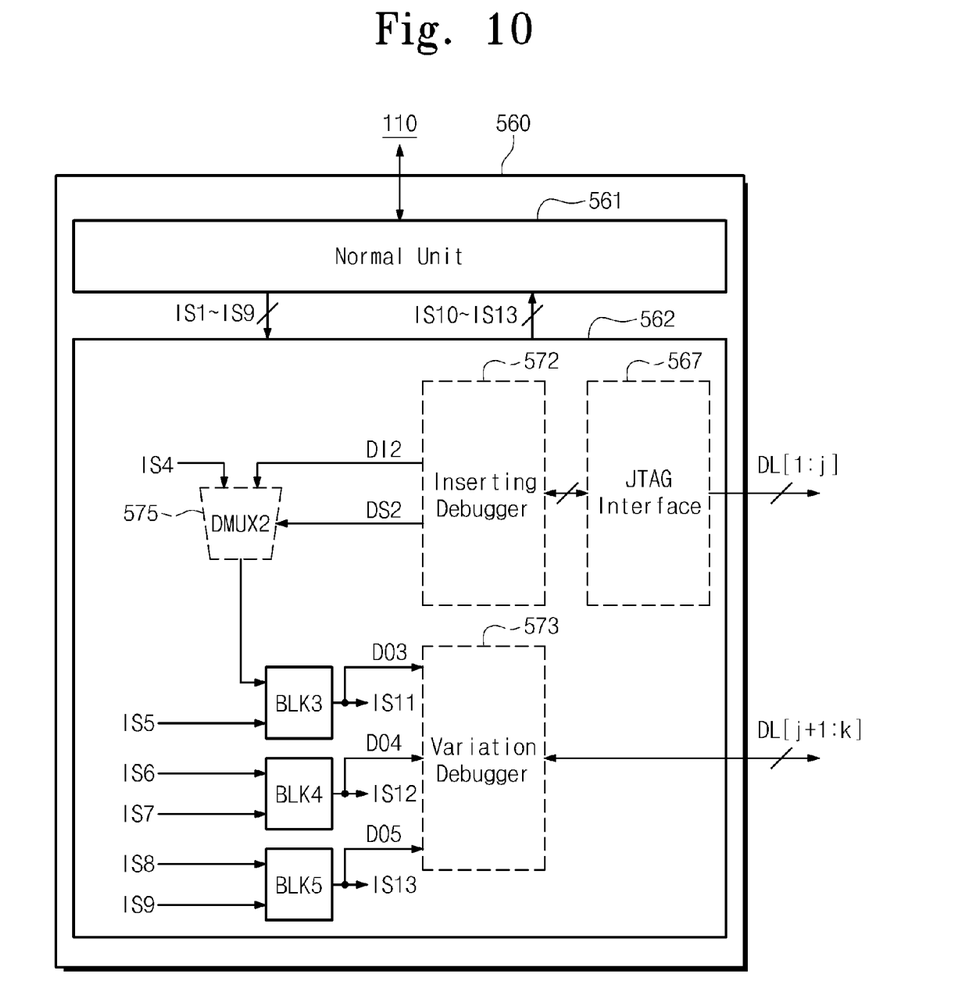
FIG. 10 is a block diagram illustrating a power control circuit that may be used in a system-on-chip (SoC) according to an exemplary embodiment of the present inventive concept.

FIG. 10 is a block diagram illustrating a power control circuit that may be used in a system-on-chip (SoC) according to an exemplary embodiment of the present inventive concept.

Referring to FIG. 10, a power control circuit 560 includes a normal unit 561 and a debugging unit 562. The power control circuit 560 has a similar structure as the power control circuit 160 described with reference to FIG. 2, except that the debugging unit 562 provides an inserting debugging function executed by an inserting debugger 572 and a variation debugging function executed by a variation debugger 573, and does not include a logic value debugger. The debugging unit 562 includes a JTAG interface 567 and a debugging multiplexer 575.

Debugging for the power control circuit 560 may be performed, for example, according to the method described with reference to FIG. 5 or 6.

Figure 11:
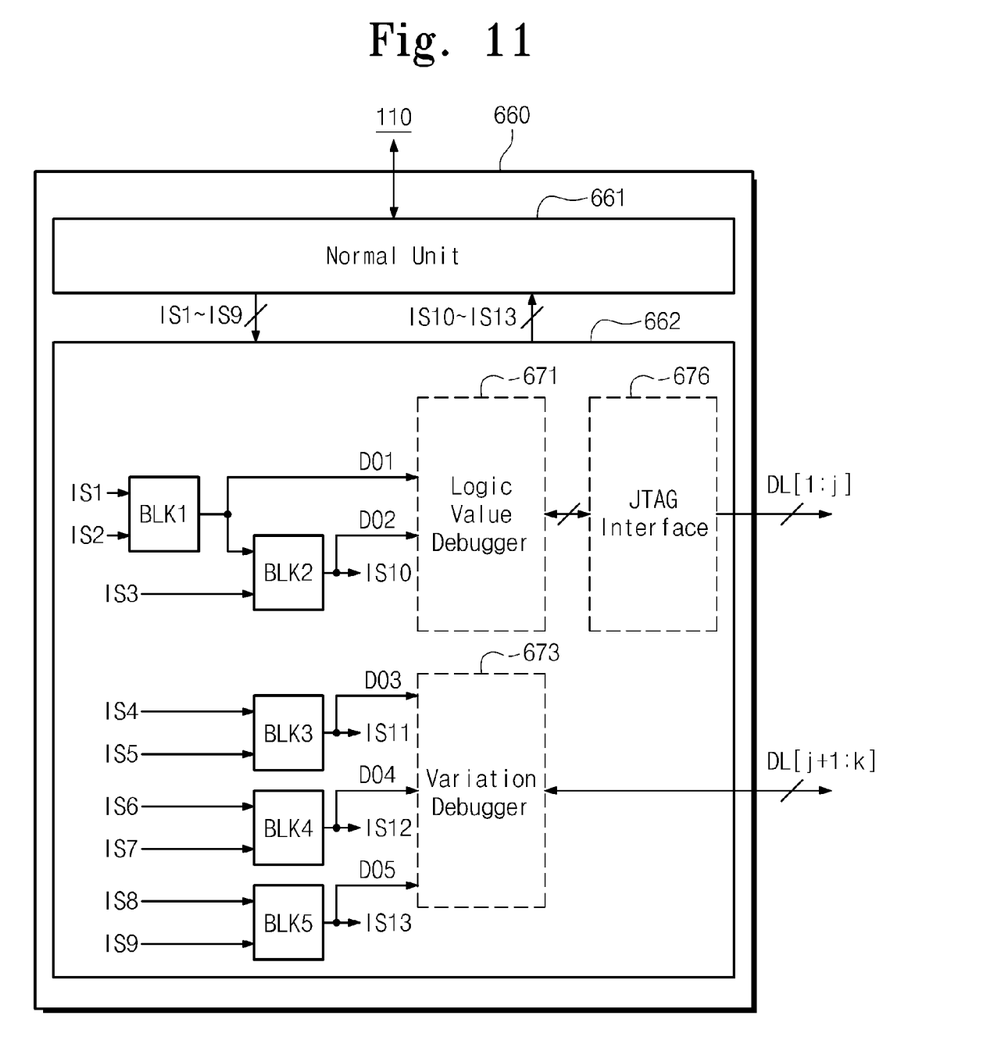
FIG. 11 is a block diagram illustrating a power control circuit that may be used in a system-on-chip (SoC) according to an exemplary embodiment of the present inventive concept.

FIG. 11 is a block diagram illustrating a power control circuit shown that may be used in a system-on-chip (SoC) according to an exemplary embodiment of the present inventive concept.

Referring to FIG. 11, a power control circuit 660 includes a normal unit 661 and a debugging unit 662. The power control circuit 660 has a similar structure as the power control circuit 160 described with reference to FIG. 2, except that the debugging unit 662 provides a logic value debugging function executed by a logic value debugger 671 and a variation debugging function executed by a variation debugger 673, and does not include an inserting debugger. The debugging unit 662 includes a JTAG interface 676.

Debugging for the power control circuit 660 may be performed, for example, according to at least one of the methods described with reference to FIGS. 3 and 5.

Figure 12:
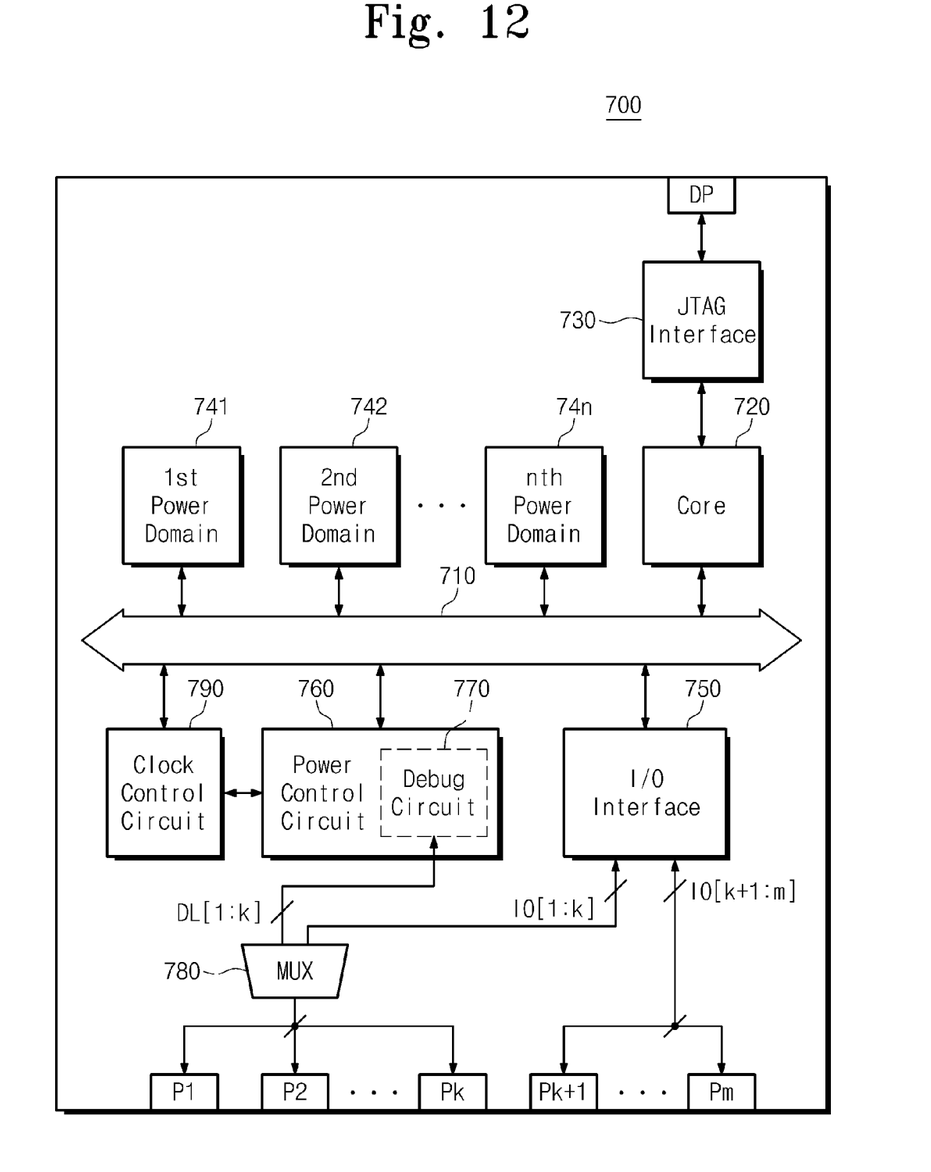
FIG. 12 is a block diagram illustrating a system-on-chip (SoC) according to an exemplary embodiment of the present inventive concept.

FIG. 12 is a block diagram illustrating a system-on-chip (SoC) according to an exemplary embodiment of the present inventive concept.

Referring to FIG. 12, a system-on-chip (SoC) 700 includes a system bus 710, a core 720, a joint test action group (JTAG) interface 730, first to nth power domain blocks 741~74n, an input/output (I/O) interface 750, a power control circuit 760, a multiplexer 780, and a clock control circuit 790.

The system bus 710, the core 720, the JTAG interface 730, the first to nth power domain blocks 741~74n, the I/O interface 750, and the multiplexer 780 are similar in structure to the components in the system-on-chip (SoC) 100 as explained with reference to FIG. 1.

The power control circuit 760 may have a similar structure as the power control circuits as explained with reference to FIGS. 1 to 11.

The clock control circuit 790 is configured to control a clock signal supplied to the core 720 and the first to nth power domain blocks 741~74n. For example, the clock control circuit 790 may disable a clock signal supplied to a component from among the core 720 and the first to nth power domain blocks 741~74n that is in an idle state.

For example, the clock control circuit 790 may operate in association with the power control circuit 760. For example, when there is a component from among the core 720 and the first to nth power domain blocks 741~74n in an idle state, a clock signal supplied to the component in an idle state may be disabled by the clock control circuit 790. Thereafter, power supplied to the component in an idle state may be disabled by the power control circuit 760. That is, when there is a component from among the core 720 and the first to nth power domain blocks 741~74n in an idle state, a clock signal supplied to the component may be disabled to stop an operation of the component, thus disabling power supplied to the component.

Similarly, when a power domain block whose power has been disabled is activated, a clock signal may be supplied to the power domain block after power is supplied to the power domain block.

Figure 13:
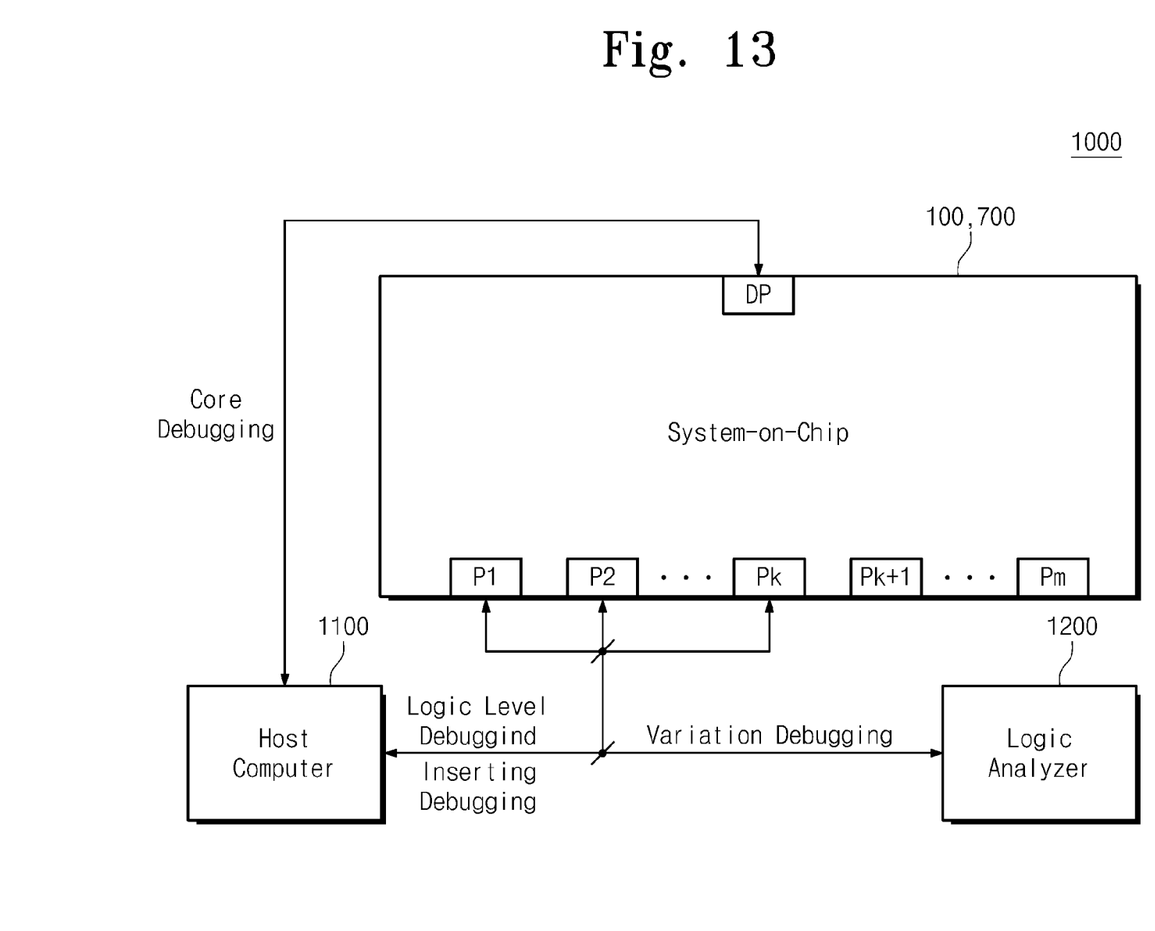
FIG. 13 is a block diagram of a test system including the system-on-chip (SoC) shown in FIG. 1 or the system-on-chip (SoC) shown in FIG. 12.

FIG. 13 is a block diagram of a test system 1000 including the system-on-chip (SoC) 100 shown in FIG. 1 or the system-on-chip (SoC) 700 shown in FIG. 12. As illustrated, the test system 1000 includes a system-on-chip (SoC) 100 or 700, a host computer 1100, and a logic analyzer 1200.

The system-on-chip (SoC) 100 or 700 may have a similar structure as explained with reference to FIGS. 1 to 13. For example, the system-on-chip (SoC) 100 or 700 provides a debugger through a core and a debugger of a power control circuit.

The host computer 1100 performs JTAG-based debugging through a debugging pin DP. In addition, the host computer 1100 performs logic level debugging and inserting debugging through first to kth input/output pins P1~Pk.

The logic analyzer 1200 performs variation debugging through the first to kth input/output pins P1~Pk.

Figure 14:
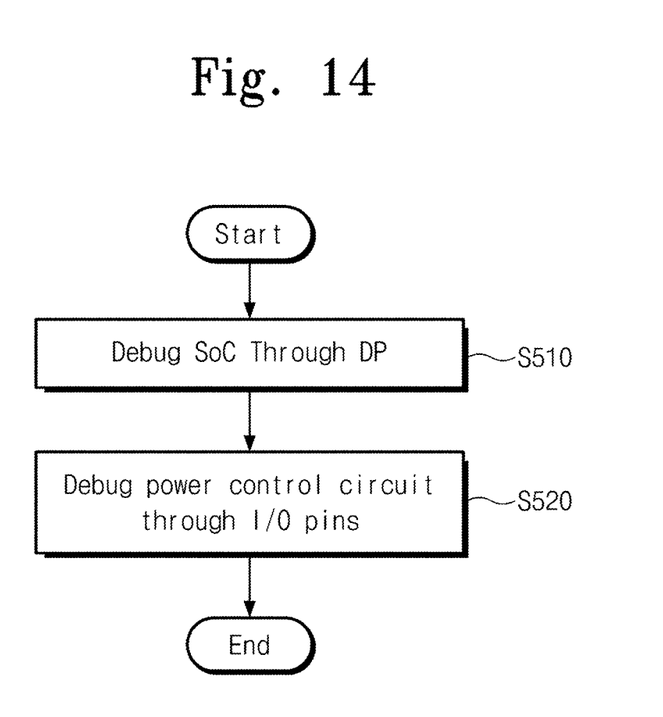
FIG. 14 is a flowchart illustrating a method for operating the test system shown in FIG. 13.

FIG. 14 is a flowchart illustrating a method for operating the test system 1000 shown in FIG. 13. Referring to FIGS. 13 and 14, at S510, the system-on-chip (SoC) 100 or 700 is debugged through a debugging pin DP. For example, the system-on-chip (SoC) 100 or 700 may be debugged based on JTAG, but debugging is not limited thereto. Debugging of the system-on-chip (SoC) 100 or 700 may be performed, for example, by the host computer 1100.

At S520, a power control circuit of the system-on-chip (SoC) 100 or 700, as explained with reference to FIGS. 1 to 12, is debugged through input/output pins P1~Pk. For example, the power control circuit may be debugged by one of a logic level debugging method, an inserting debugging method, and a variation debugging method. The power control circuit may be debugged, for example, by at least one of the host computer 1100 and the logic analyzer 1200.

As discussed above, a system-on-chip (SoC) according to exemplary embodiments of the present inventive concept provides a debugger for debugging a power control circuit. Thus, a reliable power control circuit and a reliable system-on-chip (SoC) may be provided.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A system-on-chip, comprising:
a core;
a plurality of power domain blocks; and
a power control circuit including a debug circuit, wherein the power control circuit is configured to control a power supplied to the core and each of the power domain blocks, and the debug circuit is configured to output a voltage level of at least one node within the power control circuit to an external entity in response to a debug control signal during a debugging operation of the power control circuit.

2. The system-on-chip of claim 1, further comprising:
at least one input/output pin configured to allow the debug circuit to communicate the voltage level with the external entity during the debugging operation of the power control circuit.

3. The system-on-chip of claim 2, further comprising:
an input/output interface configured to communicate with the external entity through a plurality of input/output pins,
wherein the debug circuit and the input/output interface are configured to share at least one of the plurality of input/output pins.

4. The system-on-chip of claim 2, further comprising:
a debugging pin, different from the at least one input/output pin, configured to allow for debugging of the core.

5. The system-on-chip of claim 1, wherein the debug circuit comprises:
a logic value debugger configured to output the voltage level of the at least one node of the power control circuit to the external entity, in response to the debug control signal during the debugging operation of the power control circuit.

6. The system-on-chip of claim 5, wherein the power control circuit is configured to enter an operation maintenance mode during the debugging operation of the power control circuit.

7. The system-on-chip of claim 1, wherein the debug circuit comprises:
an inserting debugger configured to vary the voltage level of the at least one node in the power control circuit, in response to the debug control signal during the debugging operation of the power control circuit.

8. The system-on-chip of claim 7, wherein the debug circuit comprises:
a multiplexer coupled between an output of a first function block of the power control circuit and an input of a second function block of the power control circuit,
wherein the multiplexer is configured to transmit one of the output of the first function block and a debugging input signal from the inserting debugger to the input of the second function block under a control of the inserting debugger.

9. The system-on-chip of claim 1, wherein the debug circuit comprises:
a variation debugger configured to output a variation value based on a variation over time of the voltage of the at least one node in the power control circuit to the external entity, in response to the debug control signal during the debugging operation of the power control circuit.

10. The system-on-chip of claim 1, wherein the debug circuit comprises:
an inserting debugger configured to vary a voltage level of an additional node in the power control circuit, different from the at least one node; and
a logic value debugger configured to output a voltage level of the at least one node in the power control circuit, based on the variation of the voltage level of the additional node, to the external entity during the debugging operation of the power control circuit.

11. The system-on-chip of claim 1, wherein the debug circuit comprises:
an inserting debugger configured to vary a voltage level of an additional node in the power control circuit, different from the at least one node; and
a variation debugger configured to output a time-lapse voltage variation of the at least one node in the power control circuit, based on the variation of the voltage level of the additional node, to the external entity during the debugging operation of the power control circuit.

12. The system-on-chip of in claim 1, further comprising:
a joint test action group (JTAG) interface, configured to allow the core to be debugged based on a JTAG protocol.

13. A debugging method for a system-on-chip, comprising:
debugging an operation of the system-on-chip through a debugging pin disposed on the system-on-chip; and
debugging a power control circuit of the system-on-chip through a plurality of input/output pins, different from the debugging pin, disposed on the system-on-chip, by monitoring a signal of a normal unit within the power control circuit, wherein monitoring the signal comprises detecting a voltage level of at least one first node in the power control circuit.

14. The debugging method of claim 13, wherein monitoring the signal further comprises varying the voltage level of at least one node, other than the at least one first node, in the power control circuit.

15. The debugging method of claim 13, wherein monitoring the signal further comprises monitoring a voltage variation of at least one node, other than the at least one first node, in the power control circuit.

16. The debugging method of claim 13, wherein monitoring the signal further comprises:
varying the voltage level of the at least one first node in the power control circuit; and
detecting a voltage level of at least one second node in the power control circuit, based on the variation of the voltage level of the at least one first node.

17. The debugging method of claim 13, wherein monitoring the signal further comprises:
varying the voltage level of the at least one first node in the power control circuit; and
monitoring a voltage variation of at least one second node in the power control circuit, based on the variation of the voltage level of the at least one first node.

* * * * *